Sept. 9, 1969 F. H. POWELL Re. 26,665

METAL ROLLING SYSTEM

Original Filed March 15, 1966

FRED HARDING POWELL,
INVENTOR,
BY Glenn, Palmer, Matthews & Lyne
HIS ATTORNEYS.

United States Patent Office

Re. 26,665
Reissued Sept. 9, 1969

26,665

METAL ROLLING SYSTEM

Fred Harding Powell, Henrico County, Va., by Reynolds Metal Company, assignee, Richmond, Va., a corporation of Delaware Original No. 3,354,502, dated Nov. 28, 1967, Ser. No. 534,469, Mar. 15, 1966. Application for reissue May 2, 1968, Ser. No. 730,209

Int. Cl. B21h *8/00*

U.S. Cl. 18—2 15 Claims

Matter enclosed in heavy brackets [ ] appears in the original patent but forms no part of this reissue specification; matter printed in italics indicates the additions made by reissue.

ABSTRACT OF THE DISCLOSURE

A rolling mill comprising parallel working rolls having cooperating working faces, each working roll having at one end a first neck portion of relatively great diameter relatively remote from the working face of the roll and at the opposite end a second neck portion of relatively small diameter close to the working face of the roll, the first mentioned ends of the respective working rolls extending in opposite directions from the working faces of the rolls, the rolls being driven through the first mentioned ends thereof, and bearings for the rolls in which the first and second neck portions are journaled. The axes of the working rolls may be substantially in a common horizontal plane. Means may be provided for feeding particles to the nip of the working rolls to compress and consolidate the particles into a strip. Backing up rolls may be provided behind the working rolls to minimize deformation thereof. The bearings for the first neck portions of the working rolls and the bearings for the second neck portions thereof overlap along the pass line of the rolling mill. The bearings for the first neck portions of the working rolls are disposed more remote from the pass line of the rolling mill than the extremities of the second mentioned ends of the working rolls.

Figure 1:
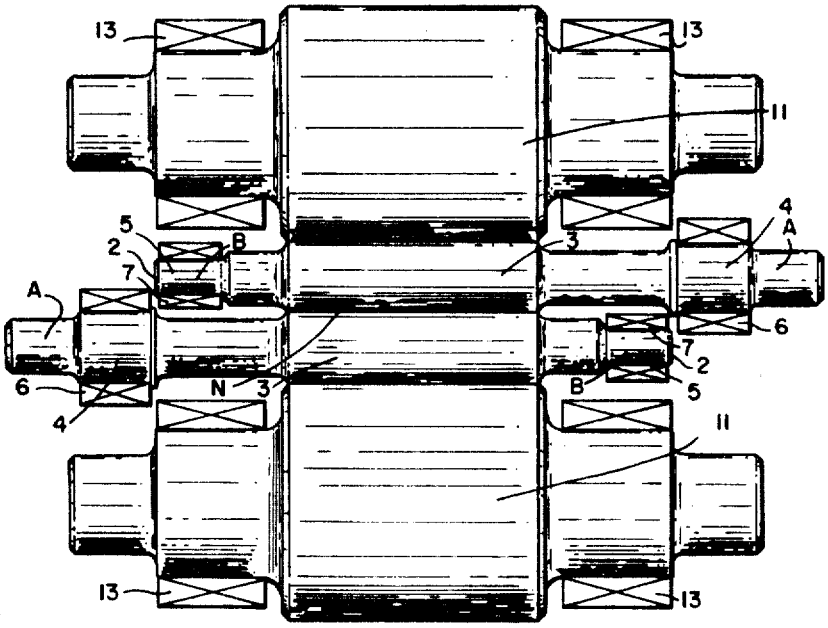

This invention relates to a rolling mill and particularly to a rolling mill comprising parallel rolls having cooperating working faces and adapted to do work requiring driving the rolls with relatively high torque. An example of a mill to which the invention is applicable is a mill for rolling particulate material into strip form and especially such a mill for rolling particulate material into relatively thin strip.

For purposes of explanation and illustration, the invention will be described as embodied in a mill for rolling metal particles into solid strip in one pass through the mill, although the invention may be used in other applications. The metal of the particles, such as aluminum, copper, lead, zinc, magnesium, nickel, silver and alloys thereof, is not critical for purposes of the invention.

To compact and compress metal particles into strip having a given thickness, it is generally necessary to limit the diameter of the working faces of the rolls; for example, to roll particles of about minus 10 to plus 60 mesh (U.S. Standard Sieve) into a strip of about one-tenth inch thickness, the preferred diameter of the working faces of the rolls is about eight to twelve inches. But to effect the compaction of the particles and the formation thereof into strip of substantial width requires driving the rolls with relatively high torque; for example, a torque of nearly three million inch-pounds on each of two work rolls is required to hot roll common aluminum alloy particles of said mesh range into strip of about one-tenth inch thickness and about forty inches width. The torque requirement would be much higher if the particles were rolled cold, and application of tension to the emerging strip is of relatively little help in minimizing the work roll torque requirement. For this as well as other reasons it is better to roll hot even though the tensile strength of hot-rolled strip is lower than that of cold-rolled strip.

There is a limit to the strength in torque of steel available for making rolling mill rolls. In conventional mills each roll has a roll neck of substantially reduced diameter compared to the diameter of the working face of the roll, so that the bearings in which the roll necks are journaled can be mounted in side-by-side relationship. This imposes a limit on the torque which a roll can withstand since the torque must be transmitted through the thinnest portion of the roll neck. Conventional mills heretofore available have not had the requisite strength for the purposes of the present invention.

Mills designed for exerting high pressure on the work may be and normally are backed mills, i.e., backing up rolls are provided pressing the working rolls against the work and minimizing deformation of the working rolls. There may be one or a cluster of backing up rolls behind each working roll. Perhaps the most common type of backed mill is the 4-high mill with one relatively large backing up roll behind each working roll. The necessity of providing space for the bearings of the backing up rolls in a conventional 4-high mill imposes a further limitation on the diameter of the journaled neck portions of the working rolls.

The rolling mill of the present invention departs from conventional concepts in order to enable unprecedentedly high torque to be imparted to rolls having working faces of given diameter. Novel design of the roll necks provides for bearings for the working rolls being offset axially of the rolls and thus minimizes the reduction necessarily imparted to the journaled neck portions of the working rolls. Also, the neck of each working roll at the driven end of the roll has relatively great diameter while the diameter of the neck at the opposite or undriven end is relatively reduced. The working rolls are of the same nonsymmetrical shape but are reversed relatively to each other, one being driven from one side of the mill and the other from the opposite side of the mill. The bearing for the smaller diameter neck portion at the undriven end of each roll is of smaller outside size than the bearing for the larger diameter neck portion at the driven end of the roll. The bearings at each side of the mill are axially offset, the smaller size bearing at each side being opposite a portion of the roll neck of relatively great diameter of the other roll through which such other roll is driven. The larger size bearing at each side of the mill may be disposed outwardly beyond the end of the cooperating working roll.

When the mill is to be employed for compressing and consolidating particulate material means such as a hopper may be provided for feeding particles to the nip of the rolls. That operation is facilitated by orienting the mill with the axes of the working rolls in a common plane extending more nearly horizontally than vertically. This enables the particles to be fed to the nip of the rolls by gravity or at least with the assistance of gravity. Also, the more nearly such common plane approaches the horizontal the less there is of imbalance of gravitational forces on the roll necks which would impose a problem due to the offset relationship of the bearings if the mill were mounted upright in conventional manner.

Other details, objects and advantages of the invention will become apparent as the following description of a present preferred embodiment thereof proceeds.

In the accompanying drawings there is shown a present preferred embodiment of the invention in which—

Figure 2:
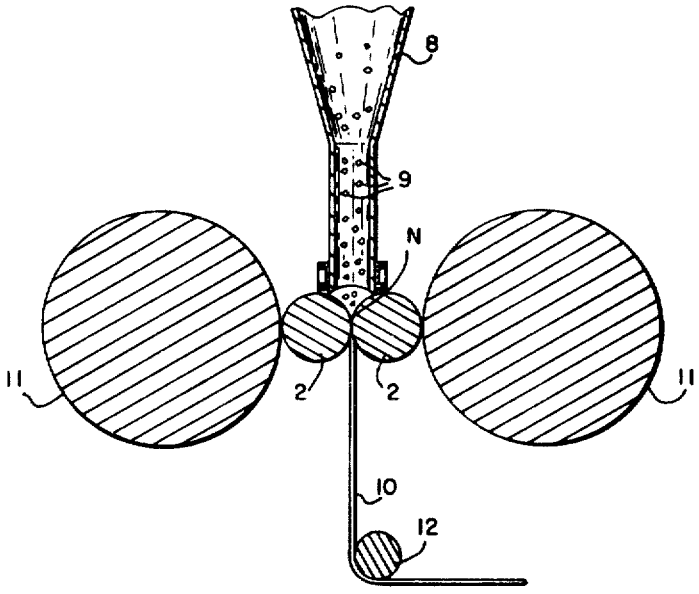

FIGURE 1 is a diagrammatic plan view of a rolling mill embodying the invention, the hopper for feeding particles to the mill being omitted to enable a clear showing of the rolls and their bearings; and FIGURE 2 is a diagrammatic elevational view of a portion of the mill shown in FIGURE 1, this figure being confined to diagrammatic showings of the working and backing up rolls, the hopper for feeding particles to the mill, the particles being fed and the strip produced, all shown in vertical cross section parallel to the pass line of the mill.

Referring now more particularly to the drawings, there is shown a rolling mill comprising parallel working rolls 2 whose axes are in a common generally horizontal plane having cooperating working faces 3, each of the rolls 2 having at one end A a first neck portion 4 of relatively great diameter relatively remote from the working face 3 of the roll and at the opposite end B a second neck portion 5 of relatively small diameter relatively close to the working face 3 of the roll, the ends A of the respective rolls 2 extending in opposite directions from the working faces 3 of the rolls, the rolls being driven through the ends A thereof by any suitable driving means, not shown, as well known to those skilled in the art, and bearings for the rolls in which the neck portions 4 and 5 are journaled. The neck portions 4 are journaled in relatively large bearings 6 and the neck portions 5 are journaled in relatively small bearings 7.

Means in the form of a hopper 8 are provided for feeding particles to the nip N of the rolls 2 to compress and metallurgically bond the particles together into a solid strip. The particles being fed are designated 9 and the strip produced is designated 10. The particles are fed downwardly, preferably by gravity, in a free flowing condition. The particles are preferably preheated to a temperature suitable for hot rolling the metal, and means (not shown) are provided for cooling the working faces of the rolls during the rolling operation.

Backing up rolls 11 are provided behind the working rolls 2 to press the working rolls against the particles 9 and minimize deformation of the working rolls. The mill shown is a 4-high mill but with the pass line vertical rather than horizontal. The strip 10 formed by compressing and consolidating the particles 9 is delivered downwardly as shown in FIGURE 2 and may be guided from vertical to horizontal direction about a guide roll 12. The strip is preferably withdrawn under tension and may be further rolled and coiled as known to those skilled in the art.

The bearings for the backing up rolls 11 are designated 13 and, as shown in FIGURE 1, are disposed nearer the pass line of the rolling mill than the bearings 6. The bearings 6 and 13 overlap along *a plane containing the center of* the pass line of the rolling mill *and perpendicular to the roll axes*. Likewise the bearings 6 and 7 overlap along [the pass line of the rolling mill] *that plane*. The bearings 7 are small enough to be disposed alongside the bearings 13 as shown in FIGURE 1. The bearings 6 are disposed outwardly of both the bearings 7 and the bearings 13 and also outwardly of the ends of the rolls journaled in the bearings 7. All of the bearings may be slidably mounted in frames and biased by springs as known to those skilled in the art, but when the mill is horizontally oriented imbalance of gravitational forces on the roll necks and bearings is avoided.

For example, a mill constructed in accordance with the invention may have working rolls having working faces initially 11½" in diameter which can be dressed down to 9½" before the rolls have to be replaced. The backing up rolls may have working faces 42½" in diameter. The width of the working faces of the working and backing up rolls may be 48" and the corresponding dimension of the hopper 8 may be somewhat less, perhaps 46". The width of the strip after trimming should be at least 42". Each roll 2 may be driven by a 1500 horsepower motor providing an available torque of 2,710,000 inch-pounds at 35 r.p.m. working roll speed when maximum torque is delivered. When rolling metal particles the strip emerges with a relatively high "forward slip" (excess of strip speed over working roll face peripheral speed) as compared with conventional strip rolling. The amount of forward slip varies with many factors, including the amount of roll pressure, but in a representative example may be 35%, more or less, when rolling one-tenth inch thickness strip from 1100 or 5005 aluminum alloy cast particles of minus 10 to plus 60 mesh, U.S. Standard Sieve, preheated to 900° F. or other suitable hot rolling temperature. Thus, in said example, when rolling at the intermediate roll speed of 35 r.p.m. and a forward slip of 33% with 11½" diameter work rolls, the strip emerges at about 140 feet per minute.

While a present preferred embodiment of the invention has been shown and described, it is to be understood that the invention is not limited thereto but may be otherwise variously embodied within the scope of the following claims.

What is claimed is:

1. A rolling mill comprising parallel rolls having cooperating working faces, each roll having at one end a first neck portion of relatively great diameter relatively remote from the working face of the roll and at the opposite end a second neck portion of relatively small diameter relatively close to the working face of the roll, the first mentioned ends of the respective rolls extending in opposite directions from the working faces of the rolls, the rolls being driven through the first mentioned ends thereof, and bearings for the rolls in which the first and second neck portions are journaled.

2. A rolling mill as claimed in claim 1 in which the axes of the parallel rolls are substantially in a common horizontal plane.

3. A rolling mill as claimed in claim 1 in which means are provided for feeding particles to the nip of the parallel rolls to compress and consolidate the particles into a strip.

4. A rolling mill as claimed in claim 2 in which means are provided for feeding particles to the nip of the parallel rolls to compress and consolidate the particles into a strip.

5. A rolling mill as claimed in claim 1 in which backing up rolls are provided behind the parallel rolls to minimize deformation thereof.

6. A rolling mill as claimed in claim 2 in which backing up rolls are provided behind the parallel rolls to minimize deformation thereof.

7. A rolling mill as claimed in claim 3 in which backing up rolls are provided behind the parallel rolls to minimize deformation thereof.

8. A rolling mill as claimed in claim 4 in which backing up rolls are provided behind the parallel rolls to minimize deformation thereof.

9. A rolling mill as claimed in claim 1 in which the bearings for the first neck portions of the parallel rolls and the bearings for the second neck portions of the parallel rolls overlap along *a plane containing the center of* the pass line of the rolling mill *and perpendicular to the roll axes.*

10. A rolling mill as claimed in claim 9 in which the bearings for the first neck portions of the parallel rolls are disposed more remote from [the pass line of the rolling mill] *said plane* than the extremities of the second mentioned ends of the parallel rolls.

11. A 4-high rolling mill for rolling metal particles into solid strip comprising working rolls having cooperating working faces and backing up rolls behind the working rolls, means to feed particles into the nip of the work rolls, each working roll having at one end a first neck portion of relatively great diameter relatively remote from the working face of the roll and at the opposite end a second neck portion of relatively small diameter relatively close to the working face of the roll, the first mentioned ends of the respective working rolls extending in opposite directions from the working faces of the rolls, the working rolls being driven through the first mentioned ends thereof, bearings for the working rolls in which the first and second neck portions are journaled and bearings for the backing up rolls nearer *a plane containing the center of* the pass line of the rolling mill *and perpendicular to the roll axes* than the bearings for the first neck portions of the working rolls.

12. A 4-high rolling mill as claimed in claim 11 in which the axes of the rolls are in a substantially common plane extending more nearly horizontally than vertically.

13. A 4-high rolling mill as claimed in claim 11 in which the bearings for the first neck portions of the working rolls and the bearings for the backing up rolls overlap along [the pass line of the rolling mill] *said plane.*

14. A 4-high rolling mill as claimed in claim 13 in which the bearings for the first neck portions of the working rolls and the bearings for the second neck portions of the working rolls overlap along [the pass line of the rolling mill] *said plane.*

15. A 4-high rolling mill as claimed in claim 14 in which the axes of the rolls are substantially in a common horizontal plane.

References Cited

The following references, cited by the Examiner, are of record in the patented file of this patent or the original patent.

UNITED STATES PATENTS

| | | | |
|---|---|---|---|
| 460,882 | 10/1891 | Nevegold. | |
| 1,206,746 | 11/1916 | Worth | 72—249 |
| 1,571,545 | 2/1926 | Gibbons. | |
| 1,621,284 | 3/1927 | Slick. | |
| 1,772,248 | 8/1930 | Gibbons | 72—249 X |
| 2,167,544 | 7/1939 | De Bats et al. | |
| 3,298,060 | 1/1967 | Michalak | 18—9 |

WILLIAM J. STEPHENSON, Primary Examiner